United States Patent [19]

Lauper et al.

[11] Patent Number: 4,891,599
[45] Date of Patent: Jan. 2, 1990

[54] EXPANDER SYSTEM FOR PULSE SIGNALS

[75] Inventors: Alfred Lauper, Obfelden; Andreas Steffen, Schlieren, both of Switzerland

[73] Assignee: Siemens-Albis, AG, Zurich, Switzerland

[21] Appl. No.: 268,120

[22] Filed: Nov. 7, 1988

Related U.S. Application Data

[63] Continuation of Ser. No. 876,145, Jun. 19, 1986, Pat. No. 4,812,771.

[30] Foreign Application Priority Data

Oct. 23, 1985 [CH] Switzerland ............... 04566/85

[51] Int. Cl.$^4$ .................... H03K 5/22; H03K 5/00
[52] U.S. Cl. .................... 328/109; 328/133; 328/155; 328/55; 328/111; 307/262; 307/518; 375/122
[58] Field of Search ............ 328/168, 133, 109, 155, 328/55, 111, 112; 307/262, 518, 511, 513, 265, 271, 267; 375/122, 58; 333/110, 131, 134; 332/50

[56] References Cited

U.S. PATENT DOCUMENTS

| | | | |
|---|---|---|---|
| 3,119,964 | 1/1964 | Crafts | 328/155 |
| 3,157,725 | 11/1964 | Wayne, Jr. | 328/158 |
| 3,662,290 | 5/1972 | Elliott | 328/168 |
| 3,668,533 | 6/1972 | Fish et al. | 328/168 |
| 4,037,159 | 7/1977 | Martin | 375/58 |
| 4,095,196 | 6/1978 | Seidel | 307/262 |
| 4,821,293 | 4/1989 | Shimizume et al. | 328/155 |
| 4,829,257 | 5/1989 | Cooper | 328/155 |

Primary Examiner—Andrew J. James
Assistant Examiner—Richard Roseen
Attorney, Agent, or Firm—David N. Caracappa

[57] ABSTRACT

An expander system for pulse signals with enhanced output power level is disclosed. The expander system, which comprises an expander filter and subsequently connected amplifier means, is provided with a supplementary 180 degree phase modulator connected in front of the expander filter. The phase modulator is switched on and off by a control signal delivered from a control stage in such a manner that, during the duration of a pulse signal, the phase modulator produces at least two phase shifts of approximately 180 degrees.

5 Claims, 4 Drawing Sheets

EXPANDER SYSTEM FOR PULSE SIGNALS

This is a continuation of application Ser. No. 06/876,145 filed June 19, 1986 now U.S. Pat. No. 4,812,771, Mar. 14, 1989.

BACKGROUND OF THE INVENTION

1. Technical Field

The present invention relates to the field of compandors used in transmission systems generally and, more particularly, to a new and improved expander system for pulse signals comprising an expander filter and at least one subsequently connected amplifier.

2. Description of the Prior Art

Expander systems for pulse signals as employed, for instance, in radar systems in which a very great expansion is needed, present some disadvantages derived from the fact that the output signal of the expander filter in such a system will have always an extremely low power. Therefore, the subsequently connected amplifier or amplifiers must have a very high amplification factor. Known expander systems do not meet the requirements that systems, such as radar systems, with very great signal expansion requirements demand.

SUMMARY OF THE INVENTION

Therefore, it is a primary object of the present invention to provide a new and improved expanders system for pulse signals which does not exhibit the aforementioned drawbacks and shortcomings of prior art expander systems.

Another and more specific object of the present invention aims at providing a new and improved expander system of the previously mentioned type which supplies expanded signals with enhanced output power levels.

Yet a further significant object of the present invention aims at providing a new and improved expander system of the character described which is relatively simple in design and construction, extremely economical to manufacture and highly reliable in operation.

Now in order to implement these and still further objects of the invention, which will become more readily apparent as the description proceeds, the expander system of the present invention is manifested by the features that an expander filter with a subsequently connected amplifier means is provided with a supplementary 180-degree phase modulator coupled in advance of the expander filter. This phase modulator is switched on and off by a control signal delivered from a control stage in such a manner that, during the time Ti of a pulse signal, the phase modulator produces at least phase shifts of approximately 180 degrees.

The invention will be better understood and objects other than those set forth above will become apparent when consideration is given to the following detailed description. Such detailed description makes reference to the annexed drawings wherein throughout the various figures of the drawings there have been generally used the same reference characters to denote the same or analogous components.

DETAILED DESCRIPTION

Figure 1:
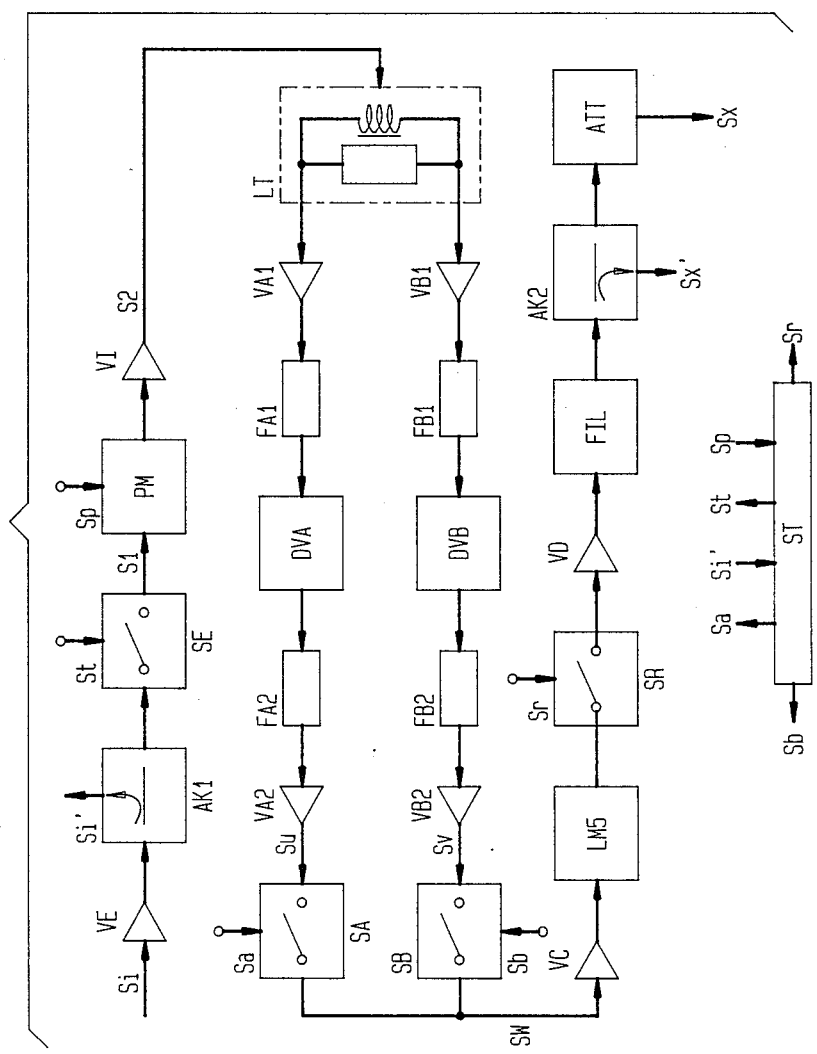
FIG. 1 shows a block circuit diagram of an expander system for pulse signals in accordance with the invention.

Describing now the drawings, it is to be understood that to simplify the disclosure thereof only enough of the structure of the expander system for pulse signals has been illustrated herein as is needed to enable one skilled in the art to readily understand the underlying principles and concepts of this invention. Turning now specifically to FIG. 1 of the drawings, the circuit arrangement illustrated therein by way of example and not limitation will be seen to comprise an input amplifier VE, which is connected on its output side through a series circuit comprising a decoupler AK1, a switch SE and a 180-degree phase modulator PM to the input of an isolation amplifier VI coupled with a power divider LT, which distributes the output signal S2 of the isolation amplifier VI between two separate expander channels. EAch such expander channel may, for example, consist of a series circuit comprising an amplifier such as amplifier VA1, a filter FA1, a SAW-filter DVA, another filter FA2, a further amplifier VA2 and a switch SA. The expander system can also work with only one expander channel. Then, the corresponding elements of the second expander channel of FIG. 1, i.e. the elements VB1, FB1, DVB, FB2, VB2 and SB2 as well as the power divider LT and eventually the switch SA, would be omitted.

Assuming in a preferred embodiment two channels, the switches SA and SB are connected at their outputs to the input of a further amplifier VC, whose output signal is delivered through a series circuit including a limiter circuit LMS, a switch SR, an amplifier VD, a filter FIL and a second decoupler AK2 to the input of an attenuator ATT which supplies the desired expanded output signal Sx.

Lastly, FIG. 1 shows an integral control circuit ST for providing control functions related to switches SE, SA, SB and SR, and phase modulator PM as a result of derived input signal Si' from decoupler AK1.

The expander system according to FIG. 1 functions as follows:

The input signal Si for the amplifier VE is delivered from an oscillator, e.g. from a coherent oscillator (COHO). A portion Si' of the amplified signal Si is branched off through the decoupler AK1 and delivered to the input of control circuit ST, which supplies the control signals ST, Sa, Sb and Sr for the switches SE, SA, SB and SR respectively as well as a control signal Sp for the phase modulator PM, at whose input there are present portions S1 (FIGS. 2 and 3) of a determined length of time Ti of a signal which includes a number of periods of the amplified signal Si.

Figure 2:
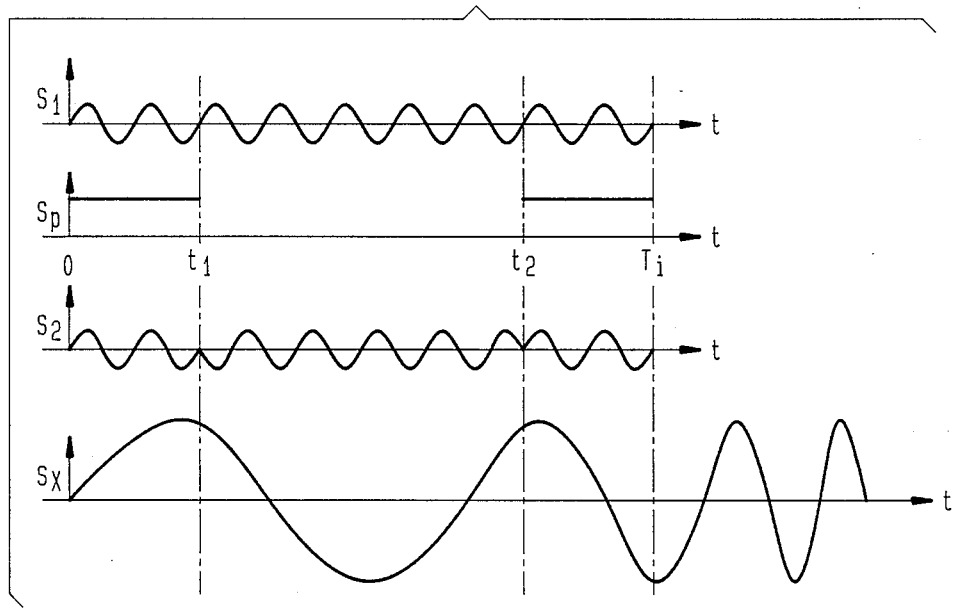
FIG. 2 shows a time diagram illustrating different signals according to a first embodiment of the invention.
Figure 3:
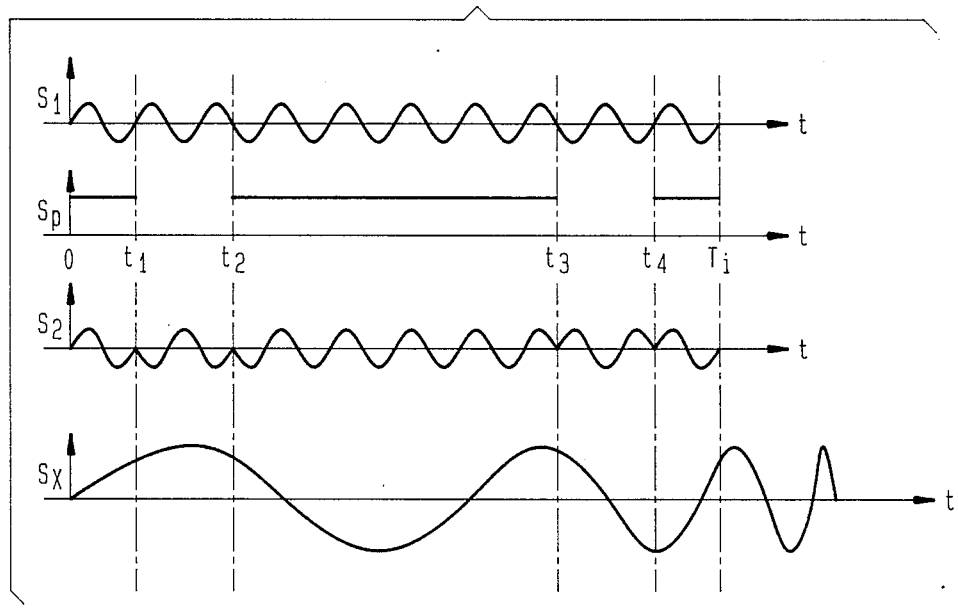
FIG. 3 shows a time diagram illustrating different signals according to a second embodiment of the invention.

At the control input of the phase modulator PM appears occasionally a signal Sp of the length of time Ti (FIGS. 2 and 3). The signal Sp according to FIG. 2 is active only between the instants t1 and t2, for which the relationship (t2−t1)/Ti=g being smaller than 1 applies and at which instants a phase change of 180 degrees for the signal S2 occurs. The signal Sp according to FIG. 3 is active only between the instants t1 and t2 and the instants t3 and t4, for which the relationships (t4−t1)/Ti=p being smaller than 1 and (t3−t2)/Ti=q being smaller than p apply and at which instants a 180-degree phase shift for the signal S2 occurs. In both cases, it will be advantageous if the phase changes take place at the zero crossing points. Since the proper expansion of the signal S2 after an optional amplification and filtering will be produced in the SAW-filters DVA and/or DVB, it is possible to omit several or all of the amplifiers VI, VA1, VB1 and filters FA1, FB1, which serve only to improve the properties of the signals. The expanded signal has a duration Te which is much greater than Ti and is therefore extremely weak, so that a subsequent amplification, for example by means of the amplifiers VA2, VB2 and/or VC, will be necessary. The optional filters FA2 and FB2 are intended for the attenuation of unwanted frequencies. The optional limiter circuit LMS is provided to obviate the effect so that the amplitude of the single expanded oscillations is not constant.

The expanded signal presents also forward and following waves which can be eliminated through the switch SR, so that after passing the amplifier VD and the filter FIL a rather clean and strong expanded signal of duration Te can be tapped at the output of the attenuator ATT. The signal Sx' branched off from decoupler AK2 can be employed for control and/or synchronizing purposes. With the switches SA and SB it is possible to select two differently expanded signals.

By means of the supplementary 180-degree phase modulator PM according to the invention, which produces the phase changes at the instants t1, t2 (FIG. 1) or t1, t2, t3 and t4 (FIG. 3), an appreciable diminution of the attenuation compared with known expander systems without a phase modulator PM can be obtained because of the enhancement of power density produced in the desired frequency band. This leads to some advantages in respect to signal-to-noise ratio and the amplification factor of the subsequent amplifier.

Figure 4:
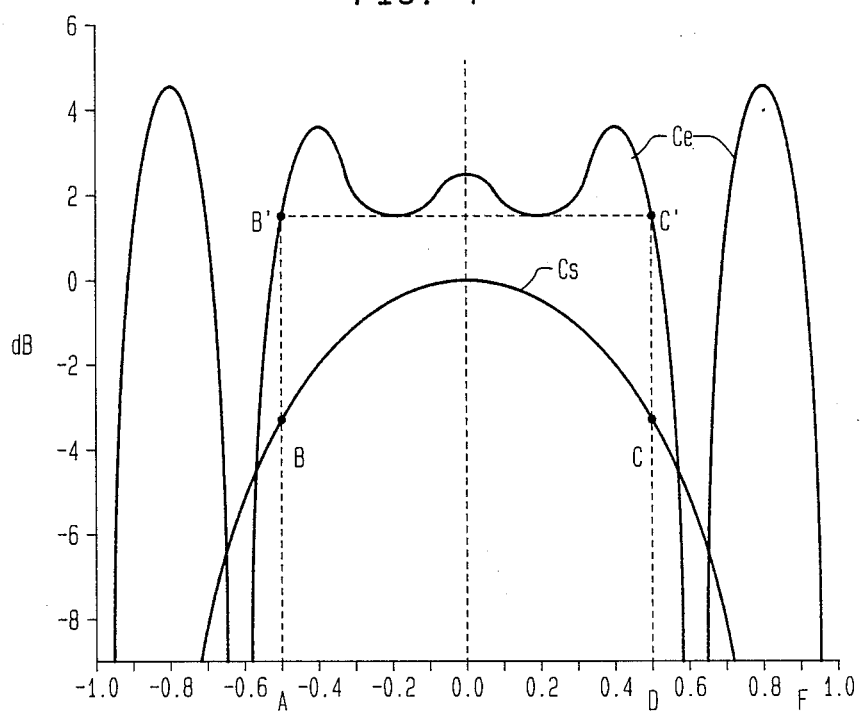
FIG. 4 shows the spectrum of an exciting signal in accordance with the invention and an exciting signal according to the prior state of the art.

In FIG. 4, the curve Cs represents the attenuation in dB of an expander system without the phase modulator PM and the curve Ce represents the attenuation of an expander system with four phase changes according to FIG. 3 as a function of the normalized frequency F, for which the relationship F=(f−fm)/B applies, wherein f is the useful frequency, fm the center frequency, B the bandwidth and wherein further B·Ti=To=constant.

In an expander system with four phase changes (FIG. 3), the following values at least approximately should preferably be employed To=3.9082 p=0.8333 q=0.5000 and in a preferred embodiment with only two phase changes (FIG. 2), preferably the following values:
To=2.35 g=0.708

In known expander systems with a subsequently connected limiter circuit LMS, only that portion of the spectrum Cs contained within the quadrangle ABCD (FIG. 4) can be utilized, since the remaining portion is lost through the limiter circuit. In contrast with the state of the art, the useful portion of the spectrum Ce according to the invention is determined by the quadrangle AB'C'D, which leads to a gain of more than 5 dB. While the inventive expander system presents two unwanted frequency lobes in the frequency bands F=0.6 to 1 and F=−0.6 to −1 respectively, these can easily be filtered.

Figure 5:
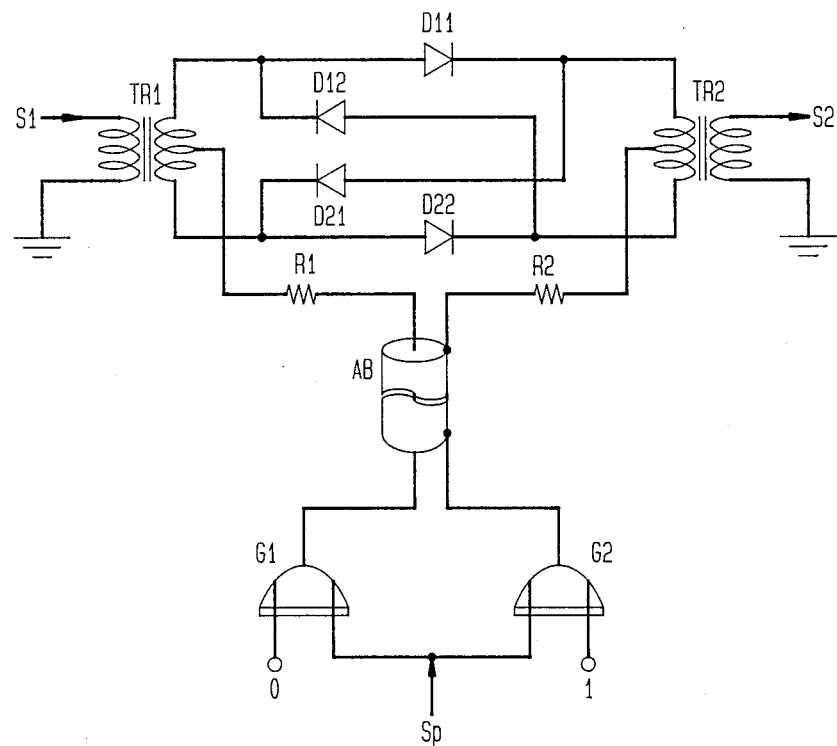
FIG. 5 shows a block circuit diagram of a phase modulator PM (FIG. 1) for an inventive expander system.

The phase modulator PM of FIG. 1 according to FIG. 5 comprises two ring transformers TR1, TR2, for example, of ferrite core, the middle tap of their secondary winding being each connected through a resistor R1 or R2 to the output of a corresponding exclusive OR, gate G1 and G2, respectively.

The first or uppermost terminal in the drawing of the secondary winding of transformer TR1 is connected through a diode D11 to the first terminal of the secondary winding of transformer TR2 and thorugh a diode D12, connected in reverse direction, to the second terminal of the secondary winding of transformer TR2. Analogously, the second terminal of the secondary winding of transformer TR1 is connected through a diode D22 to the second terminal of the secondary winding of transformer TR2 and through a diode D21, connected in reverse direction, to the first terminal of the secondary winding of transformer TR2.

The exclusive OR gate G1 receives at its first input a logic "0" signal and at its second input the signal Sp which is also fed to the first input of the exclusive OR gate G2 whose second input receives in turn a logic "1" signal. Occasionally, a relatively long transmission line may be needed between the outputs of the gates G1, G2 and the resistors R1, R2. In this case, the line which connects the output of the gate G1 with the resistor R1 may be protected by a conductive shielding AB connected to the output of the gate G2 and to the resistor R2.

The phase modulator PM of FIG. 1 shown in FIG. 5 functions in the following manner:

If the signal Sp becomes the logic value "0", the diodes D11 and D22 will be conductive, and the signal S1 fed into the primary of the transformer TR1 appears without a phase shift as a signal S2 at the output of the secondary of transformer TR2. However, as soon as the signal Sp switches over to the logic value "1", the diodes D12 and D21 begin to be conductive and at the same moment the signal S2 suffers a phase change of approximately 180 degrees.

Figure 6:
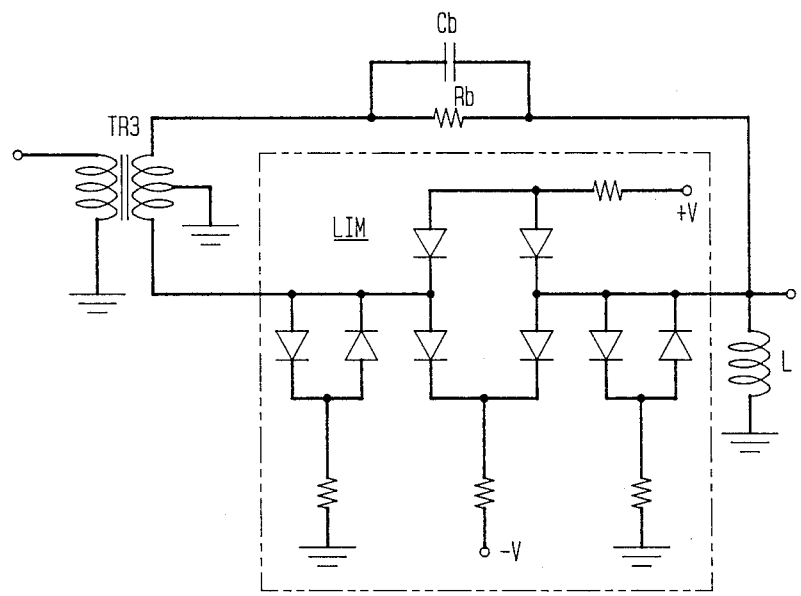
FIG. 6 shows a block circuit diagram of a limiter circuit LMS (FIG. 1) for an expander system in accordance with the invention.

The limiter circuit LMS of FIG. 1 according to FIG. 6 comprises a limiter LIM, for instance a type WJ-LA 7 limiter, commercially available from the Watkins-Johnson Company whose output is connected, on the one hand, through a coil L to a terminal at a reference potential and, on the other hand, via the series circuit of a capacitor Cb and the secondary winding of a transformer TR3 to the input of the limiter. A middle tap of this secondary is connected to a reference potential. The useful signal Sw is fed to the primary of the transformer TR3. The capacitor Cb has a relatively small capacity and can have a parallel connected resistor Rb. The capacitor Cb and/or the resistor Rb meliorate the phase loop and the limiter characteristic.

While there are shown and described preferred embodiments of the invention, it is to be distinctly understood that the invention is not limited thereto, but may be otherwise variously embodied and practiced within the scope of the following claims.

What is claimed is:

1. An expander system comprising:
   a source of repetitive pulse signals, having pulse widths Ti, genererated from an input AC-signal;
   an output terminal;
   a phase modulator, coupled to said source, and having a control input terminal;
   an expander filter and amplifier means serially coupled in order between said phase modulator and said output terminal; and
   a control stage, coupled between said source and said control input terminal of said phase modulator, for generating a control signal selectively enabling and inhibiting said phase modulator such that, within the time length Ti of a one of said repetitive pulse signals, at least two phase changes of at least approximately 180 degrees are produced.

2. The expander system according to claim 1, wherein the phase modulator produces two phase changes after the time lengths t1 and t2 satisfying the condition:

$$t1 + t2 = Ti,$$

wherein the time lengths t1 and t2 are counted at least approximately from the starting point of said one of said repetitive pulse signals.

3. The expander system according to claim 2, wherein for the time lengths t1 and t2, there are valid the following conditions:

$$(t2 - t1)/Ti = 0.71 \pm 0.1$$

$$B \cdot Ti = 2.35 \pm 0.1$$

wherein B is the bandwidth of said repetitive pulse signals.

4. The expander system according to claim 1, wherein the phase modulator produces four phase changes after the time lengths t1, t2, t3 and t4 satisfying the condition:

$$t1 + t4 = t2 + t3 = Ti$$

wherein the time lengths t1, t2, t3 and t4 are counted at least approximately from the starting point of said one of said repetitive pulse signals.

5. The expander system according to claim 4, wherein the the time lengths t1, t2, t3 and t4, there are valid the following conditions:

$$(t4 - t1)/Ti = 0.83 \pm 0.1$$

$$(t3 - t2)/Ti = 0.50 \pm 0.1$$

$$B \cdot Ti = 3.91 \pm 0.1$$

wherein B is the bandwidth of said repetitive pulse signals.

* * * * *